United States Patent [19]

Flesher et al.

[11] Patent Number: 4,537,513

[45] Date of Patent: Aug. 27, 1985

[54] PROCESS FOR DISSOLVING POLYMERIC MATERIAL

[75] Inventors: Peter Flesher; John G. Langley, both of West Yorkshire, England

[73] Assignee: Allied Colloids Limited, United Kingdom

[21] Appl. No.: 519,601

[22] Filed: Aug. 2, 1983

[30] Foreign Application Priority Data

Aug. 6, 1982 [GB] United Kingdom ............... 8222726
Nov. 9, 1982 [GB] United Kingdom ............... 8231898
May 13, 1983 [GB] United Kingdom ............... 8313165

[51] Int. Cl.³ .............................................. B01F 5/00
[52] U.S. Cl. .................................... 366/162; 366/177; 366/182; 366/192; 366/339; 422/278; 422/901
[58] Field of Search ............... 366/151, 152, 162, 165, 366/167, 173, 174, 177, 182, 183, 192, 338, 339, 341, 348; 422/228, 278, 901; 251/208

[56] References Cited

U.S. PATENT DOCUMENTS 3,468,322  9/1969  Katzer ................................ 366/142
3,606,093  9/1971  Morse et al. ....................... 422/901
4,168,018  9/1979  Zahaykevich ..................... 366/339
4,189,795  2/1980  Conti et al. ......................... 251/208

Primary Examiner—Robert W. Jenkins
Assistant Examiner—Arthur D. Dahlberg

[57] ABSTRACT

A dispersion of polymeric particles in a non-aqueous liquid is mixed with water with sufficient agitation to initiate substantial dissolution of the particles into water and is substantially homogeneously dispersed into the water substantially immediately, for instance in less than 50 milliseconds from the initiation of substantial dissolution. Preferred apparatus is an orifice mixer having a mixing chamber 41 leading to an orifice 51 and supplied by an inlet 46 for dispersion, the inlet terminating in a valve 47 and an orifice 44, and an inlet 45 for water. The effective outlet area of the orifice 51 is adjusted by an eccentrically mounted aperture plate 52 and there is a shear helix 57.

12 Claims, 7 Drawing Figures

PROCESS FOR DISSOLVING POLYMERIC MATERIAL

It can be difficult to obtain rapidly a uniform solution in water of particles of water soluble polymeric material since once the polymeric material starts dissolving it forms a film of a concentrated solution of the polymer around each particle and makes the particles very sticky and liable to aggregate. If aggregates are formed then water can only penetrate them very slowly and as a result sticky lumps of polymer are formed and total dissolution is very slow. The problem is particularly serious when the particles are small, e.g. between 0.1 and 10 $\mu$m in diameter.

Mere scattering of polymer particles into water accompanied by stirring almost inevitably leads to significant aggregation. To minimise this, it is known to add the particles to water while in the form of a dispersion in oil or other non-aqueous liquid. It is well accepted that vigorous agitation is required and conventionally this agitation is applied for a considerable time with the intention of improving dissolution.

A suitable mechanical device for this purpose is a T-piece followed by an in-line turbulence inducer such as is described by Katzer in U.S. Pat. No. 3,468,322. Thus significant mixing will occur at the T-piece, and dissolution will start at this point, but the dissolving system is then transferred to an elongated turbulence inducer with the intention of improving contact and dissolution. The time of passage between the T-piece and the exit from the turbulence inducer is generally several seconds or more.

Although apparatus such as this is adequate for larger particles, for instance 10 $\mu$m or more, it still suffers from a significant risk of the formation of lumps of polymer, when the particles are smaller, for instance 0.1 to 5 $\mu$m. In general when such particles, as a dispersion in oil, are mixed into water it is inevitable that some lumping will occur and so a uniform solution is only obtained after a prolonger dissolution period.

It is known that the inclusion in the dispersion or in the water of surface active agents that will promote dispersion of the oil into water will greatly facilitate solution of the polymer particles. This is described by Hawkins in U.S. Pat. No. 3,122,203 and is also mentioned in British Patent Specification No. 1,364,873. The surface active dispersing agents suitable for this purpose are described in those specifications and may be conveniently referred to as activators. In addition to optimising the dissolution of the polymer particles, especially when they are very small, the use of an activator has come to be accepted as leading to the production of polymer solutions having the best attainable properties as, for instance, flocculants.

Despite the advantages of activators we have recognised that their use is associated with a number of disadvantages. Firstly, it is both costly and environmentally undesirable to use large amounts of activator.

Secondly, it is necessary to select the amount of activator carefully. We find that optimum results require the selection of a critical amount of activator and that this amount is dependent upon, for instance, the water quality, water temperature, the activator chemical type, the polymer dispersion viscosity, the intensity and duration of agitation and polymer concentration in water. It is therefore not possible to provide one activator at one dose level that will provide optimum properties under all conditions encountered in practice.

Thirdly, its incorporation into the dispersion or the water can be inconvenient or difficult and it can lead to destabilisation of the dispersion and/or blockage of the mixing apparatus.

Orifice mixers are known to be useful for mixing immiscible liquids.

In German OLS No. 2533108 a process is exemplified in which an orifice mixer is used for mixing a dispersion in oil of water soluble polymer with water in the presence of activator for the purpose of producing an aqueous solution of the polymer. It appears that the orifice mixer used is a conventional orifice mixer having supply inlets at 90° to each other at one end of the mixing chamber and the outlet orifice at the opposite end of the chamber.

The mixture emerging from the orifice passes with turbulent flow through a mixing zone including a baffle plate 4 cm from the orifice and then through a static mixer. It is therefore clear that the orifice mixer is regarded as providing only a part of the total mixing that is necessary.

The mixing chamber has a volume of 10 ccs and the total flow rate through the chamber is 1025 ml per minute, giving an average residence time of about 600 milliseconds between the time when dissolution starts, upon initial contact of the liquids, and the time when most of the mixing effect is applied, namely passage through the orifice. The time for the further essential mixing, past the baffle plate, will be much longer.

We have now made the surprising discovery that the rate of dissolution and the quality of the final solution are strongly influenced by what happens at the initial point of contact of the water and the dispersion, i.e. within the first few milliseconds. All prior proposals have concentrated upon applying adequate shear or other mixing forces eventually, but without realising the criticality of applying these forces substantially instantaneous upon contact.

A process according to the invention for dissolving into water the polymeric particles of a dispersion of the particles in a non-aqueous liquid comprises mixing the dispersion with water with sufficient agitation to initiate substantial dissolution of the particles into water and substantially homogeneously dispersing the dispersion into the water within a period of less than 100 milliseconds from the initiation of substantial dissolution, and then completing the dissolution of the particles into water.

Substantial dissolution of the particles into water can generally be regarded as being initiated instantaneously upon contact of the dispersion with water. However, if the non-aqueous liquid is very immiscible with water and if no activator to promote mixing is used, and if agitation is low it may be possible to achieve laminar flow upon initial contact in which event substantial dissolution will be initiated only when agitation is increased to give mixing of the water with the dispersion.

Substantial homogeneous dispersion of the dispersion into the water exists if there is substantially no aggregation of particles prior to total dissolution of the particles into water. The substantially homogeneous dispersion is generally mixed into a larger volume of water (that may be an aqueous solution of the polymer) and completion of dissolution generally occurs in this water rather than solely in the water used for forming the initial mixture.

The substantially homogeneous dispersion generally results in a dispersion being broken down into substantially monoparticulate droplets, that is to say each droplet of non-aqueous liquid in the resultant oil-in-water dispersion contains substantially one particle of polymer.

Attainment of droplets none of which contain more than one polymer particle gives best results but adequate results can be obtained if some or all of the droplets contain a few polymer particles instead of just one. Generally, each droplet contains not more than 500, most preferably not more than 100, polymer particles. Best results are obtained when each droplet contains 1–50, preferably 1 to 5, most preferably 1 or 2, polymer particles.

The attainment of substantially homogeneous dispersion necessitates the application of vigorous agitation and in particular high shear.

The high shear that is required to disperse the dispersion substantially homogeneously into the water will generally be considerably in excess of the amount that the final polymer solution could withstand without undergoing degradation of the polymer. The shear is therefore applied only for as long as is necessary to achieve the desired dispersion and the theoretical optimum conditions would be provision of an infinitely great shear for an infinitely short time. In practice however, shear is applied over a short period to strip the individual polymer particles of their protective oil phase and to wet them out substantially independent of each other.

The high shear or other agitation can be applied by forcing the water and the dispersion of polymer particles through any convenient device capable of applying adequate shear substantially instantaneously upon contact. The application of shear generally follows from the water and the dispersion undergoing a rapid pressure drop. Normally this is at least 1.4, generally at least 3 and preferably at least 6 $kg/cm^2$, often 6 to 12 $kg/cm^2$, but generally not more than about 15 $kg/cm^2$. This pressure drop generally occurs within a period of less than 50 and preferably less than 25 milliseconds. This can occur in a shear mixer having moving parts, for instance as a result of the water and dispersion being forced through the rotating blade of an emulsifier head, but best results are most conveniently attained by using a mixer in which the shear is applied by static components, i.e. without parts that rotate at high speed.

The substantially homogeneous dispersion is best achieved by causing a large pressure drop by forcing the water and dispersions through one or more constrictions and in particular using an orifice mixer. Thus the preferred method comprises forcing the dispersion and the water into the orifice mixer and thereby bringing the dispersion and the water into contact and ejecting the resultant mixture from the orifice within a period of less than 100 milliseconds from the time of initial contact. The contact can occur substantially instantaneously with ejection from the orifice so that the mixture of water and dispersion is formed and substantially instantaneously ejected but generally the mixture is formed a few milliseconds before it is ejected.

The orifice mixer generally has a mixing chamber with an inlet for the dispersion and an inlet for the water both leading into the chamber and with the orifice leading from the mixing chamber, so that the mixture of water and dispersion, and initiation of dissolution of the polymer particles in the water, occurs in the chamber.

The orifice is much narrower than the cross sectional area of the mixing chamber immediately before it. For instance, the orifice and the mixing chamber are generally substantially cylindrical and the radius of the orifice typically is less than 50% of the radius of the mixing chamber immediately ahead of it, for instance being 20 to 40% of the radius and preferably 25 to 33% of the radius.

The shear may be applied solely as a result of extrusion through the orifice or the mixer may be adapted, as described below, to apply shear also during the travel of the dispersion through the device to the orifice, or immediately (for a few milliseconds) after the mixture is ejected from the orifice.

When shear is to be applied by means additional to ejection through the orifice this conveniently is caused by forcing the mixture through a helical groove formed between a substantially cylindrical outer housing (that may be the mixing chamber or a housing leading from the orifice) and a removable substantially cylindrical inner housing. This inner housing perferably is a shear helix, that is to say a cylindrical plug that fits within the outer housing and that has a helical groove formed in its outer surface.

An additional advantage of the use of a shear helix is that is imparts rotational motion to the mixture emerging from the orifice mixer and this facilitates intimate admixture of the resultant oil-in-water dispersion into bulk dilution water into which it preferably is led substantially directly after emerging from the orifice, i.e. within a few milliseconds.

Agitation may continue after the application of the shear (for instance in the bulk water) but will be at a level such that, by itself, it would be incapable of breaking the dispersion down to the desired substantially homogeneous distribution.

The pressure drop between the point at which the dispersion and water are brought into contact in the mixer and the point at which the ejected mixture has acquired a stable pressure, for instance as a result of emerging into bulk water, must be high and occur very quickly. This time interval must be less than 100 milliseconds and generally less than 50 milliseconds with best results being achieved when the time interval is less than 25 milliseconds and preferably less than 15 milliseconds, for instance 5 to 10 milliseconds. Typically during this very short time the oil dispersion and the water into which it is being dispersed have undergone a pressure drop of at least 1.4, perferably at least 3 and generally at least 6 $kg/cm^2$. The preferred pressure drop is generally in the range 6 to 12, most preferably 7 to 11.5 $kg/cm^2$ but in some instances pressure drops up to 15 $kg/cm^2$ are desirable.

The time interval between the start of dissolution and the initiation of the shear or other agitation that is necessary to break the dispersion down is preferably less than 20 milliseconds, most preferably less than 10 milliseconds, with best results being achieved when it is 0 to 3 milliseconds.

The process of the invention therefore differs fundamentally from all known processes in that the vigorous agitation or shear is applied substantially immediately upon contact and for a very short time only, i.e. much less than the 600 milliseconds that occur in German OLS No. 2433108 before shear is initiated and much less than the several seconds or longer in conventional in line mixing devices such as U.S. Pat. No. 3,468,322.

We find that if a conventional orifice mixer is used for combining water and a dispersion of water soluble polymer particles in non-aqueous liquid and if there is any interruption in flow of the dispersion into and through the mixer there is a risk that there will be partial dissolution of polymer within the mixer and that the mixer may become blocked by polymer gel. We minimise this problem by constructing the inlet for the dispersion so that it terminates in the mixing chamber in an orifice, for instance having a diameter 10% to 50% of the diameter of the duct leading up to the orifice. If there is an interruption in flow of dispersion polymer gel may block the orifice but since the orifice is so narrow, relative to the diameter of the duct, resumption of flow of the dispersion will push the plug of polymer gel out of the orifice.

Instead of, or generally in addition to, providing such an orifice, there may be a valve in the inlet for dispersion at or near the point where it terminates in the mixer and this valve may be held open by flow of the dispersion during normal flow and biased to shut automatically when the flow rate drops. For instance there may be a non-return ball valve at the point where the inlet terminates in the mixing chamber or, more usually, a short distance upstream from that point, for instance upstream of an orifice as described above. The valve may comprise a ball and means that bias the ball to close the inlet and that results in the inlet being closed by the ball when the flow rate through the inlet drops and being opened by the flow when it was used.

In order to obtain optimum performance, it is necessary to maintain the pressure drop at a chosen valve but it is difficult to do this whilst varying the throughput of the orifice mixer, as is required if the rate of dosage of the polymer into water has to be altered. According to another feature of the invention we control the pressure drop across the mixer by adjusting the effective outlet area of the orifice. This can be done by mounting adjacent to the orifice an aperture plate having an aperture overlapping the orifice but eccentric with respect to the orifice and by rotating the aperture plate relative to the orifice to expose the desired effective outlet area of the orifice. Either the aperture plate or the orifice may rotate with respect to the housing. Preferably the aperture plate is fixed to a block defining the internal mixing chamber and the mixing chamber and the aperture plate rotate, the orifice being fixed with respect to the housing in which the orifice mixer is constructed.

Particularly good results are achieved when the inlets discharge into the mouth of a mixing chamber distant from the orifice and when the chamber has a substantially reduced cross sectional area compared to the combined cross sectional area of the first and second inlets, thereby causing substantial acceleration to the fluid from the inlet as they pass through the mixing chamber towards the orifice. The cross sectional area of the chamber may increase again towards the orifice.

As mentioned above, the mixture emerging from the orifice is preferably ejected substantially directly into water. There can be a gap of, for instance, up to 2 or at the most 5 cm between the orifice (or any subsequent shear helix) and the water that collects the aqueous droplets, but preferably any gap is less than 1 cm. The mixture may be directed onto a baffle plate so as to distribute more uniformly into the bulk water. Preferably the mixture is distributed from the orifice, generally by a horizontal baffle plate, into the top of an inner chamber that leads to a surrounding outer chamber such that water and the dissolving polymer flows down the inner chamber and up the outer chamber to top outlet, after which it may be blended with further dilution water. Choice of the size of the chambers and the rate of flow thus dictates the dissolution time before use.

The dispersion that is provided as the source of polymer particles in the invention may be any dispersion of small water soluble particles in a non-aqueous medium. The particles may be dry polymer particles or they may be particles of polymer gel. They may have been prepared by solution polymerisation, emulsion polymerisation or suspension polymerisation and may have been prepared in the oil phase, or may have been prepared separately and then added to the oil phase. It should be understood that we are using the term "dispersion" in a generic sense to include any system of particles dispersed in a non-aqueous liquid irrespective of whether the characteristics of the particles are such that the system could properly be called an emulsion. Preferably the polymer particles are formed by reversed phase polymerisation of water soluble ethylenically unsaturated monomers such as acrylic monomers, for instance acrylamide, acrylic acid, water soluble acrylates, and co-polymers thereof.

The particles are generally between 0.1 and 10 $\mu$m in size and most preferably 0.3 to 5 $\mu$m. The dispersion may contain dispersion stabilisers or other dispersants. These may have been included to permit in situ polymerisation of aqueous monomer dispersed in oil. The water may be removed, for instance by azeotropic distillation, after polymerisation was complete. In this case the polymer particles will be substantially dry. However, the process and apparatus described is also usable when the particles are particles of an aqueous gel. Typically the dispersion contains, per part by weight polymer solids, 0.3 to 3, generally 0.75 to 1.5, parts by weight of the non-aqueous liquid and 0 to 10, generally 0 to 3, parts by weight water absorbed into the polymer particles. The amount of water mixed with the dispersion to initiate dissolution, for instance, the amount of water fed to the orifice mixer, is generally from 50 to 1000 preferably 100 to 300 parts by weight per part by weight polymer solids.

The process may be conducted with or without any activator, for instance of the type discussed above, and we surprisingly find that the presence of activator can detract from the final properties of the solution. Regardless of whether or not an activator is used the process results in the particles being substantially independently hydrated, ensuring rapid total dissolution, and in the consequential production of a solution having improved flocculating properties compared to the properties obtained when the same polymer dispersion is dissolved using conventional agitation systems.

Figure 1:
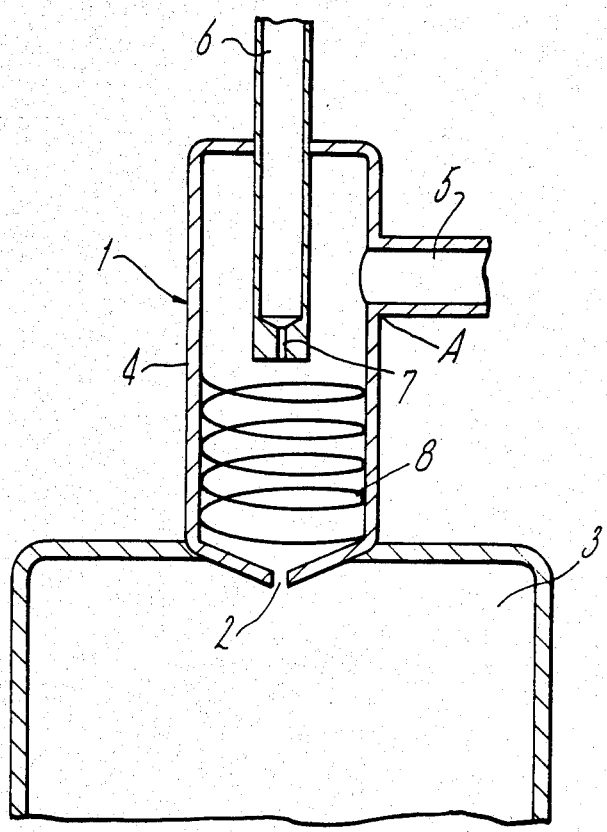
FIG. 1 is a diagrammatic illustration of one form of apparatus.

The apparatus shown in FIG. 1 is obtained by modification of a conventional air-water nozzle, with the air feed being replaced by the feed for the dispersion, and contains no moving parts. In particular the apparatus comprises a high shear nozzle 1 that feeds through a nozzle orifice 2 into a chamber 3. The nozzle 1 has a cylindrical body 4 with a tengential inlet 5 for water and an axial feed 6 for polymer in oil dispersion discharging through a feed orifice 7. There is a helical baffle 8 provided on the wall of the chamber to impart vortex type flow to the water.

The chamber 3 may be an air space through which the mixture is sprayed down onto, for instance, flowing water but preferably the chamber 3 is full of flowing water and the nozzle orifice 2 discharges direct onto the water.

Figure 2:
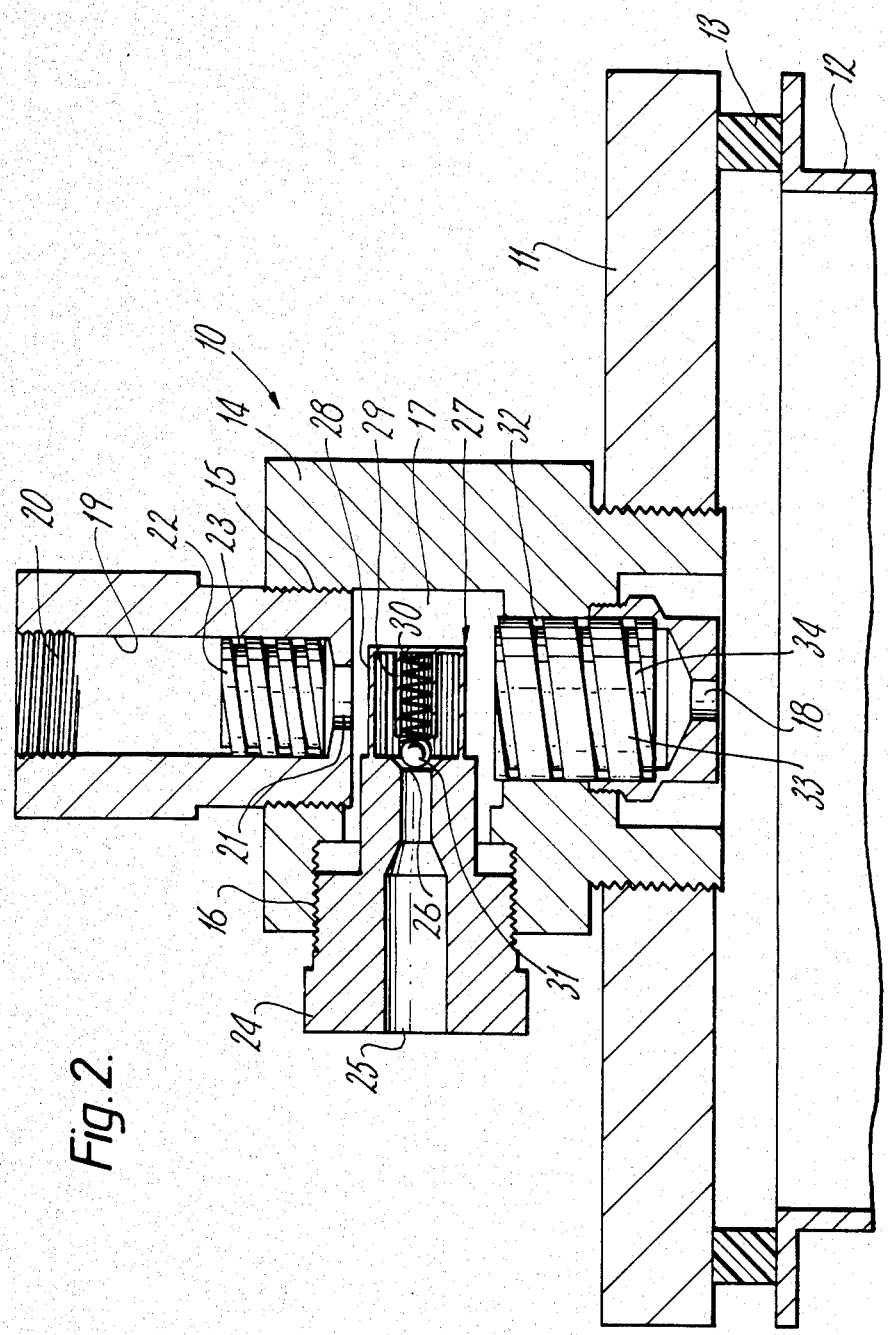
FIG. 2 is a vertical section, with the shear helixes shown in perspective, through another form of apparatus.

The apparatus shown in FIG. 2 comprises an orifice mixer 10 secured to the lid 11 of a vessel 12 filled with water up to the base of the lid 11 and provided with a gasket 13 between the lid and the vessel.

The mixer 10 comprises a housing 14 having a first inlet 15 and a second inlet 16 and defining an internal mixing chamber 17 leading to an orifice 18.

Threaded into the inlet 15 is a water supply duct 19. This inlet duct is provided with threads 20 for securement of a water supply pipe and terminates in a nozzle 21. Immediately before the nozzle 21 there is a shear helix 22 resting in the duct. This shear helix is a solid cylinder that is in a sliding fit with the bore of the duct 19 and which has a helical groove 23 around its outer surface.

Threaded into the second inlet 16 is a member 24 that defines a cylindrical duct 25 that terminates in the mixing chamber 17 at an open end 26. Integral with the member 24 is a cage 27 comprising a number of ribs 28 and 29 parallel with the axis of the ducts. A helical spring 30 slides between a number of ribs 29 and is guided by these ribs and engages against a ball 31.

When dispersion is flowing through the bore 25 the flow of the dispersion displaces the ball 31 from the end 26 of the duct and the dispersion exits into the chamber 17. When the flow of dispersion slows the spring 30 causes the ball to seat against the end 26 and to seal the duct 25 against entry of water from the chamber 17.

The construction of the cage 27 and the ribs 28 and 29 is such that there is insignificant impedance on the flow of water from the duct 19 towards the orifice 18.

The mixing chamber includes not only the zones into which the inlets discharge but also a rotational mixing zone 32 coaxial with the orifice 18. This rotational zone is a cylindrical passage containing a shear helix 33 (shown, like helix 22, in perspective). This helix is a solid cylinder that is in a loose sliding fit with the zone 32 and which has on its outer surface a helical groove 34.

Figure 3:
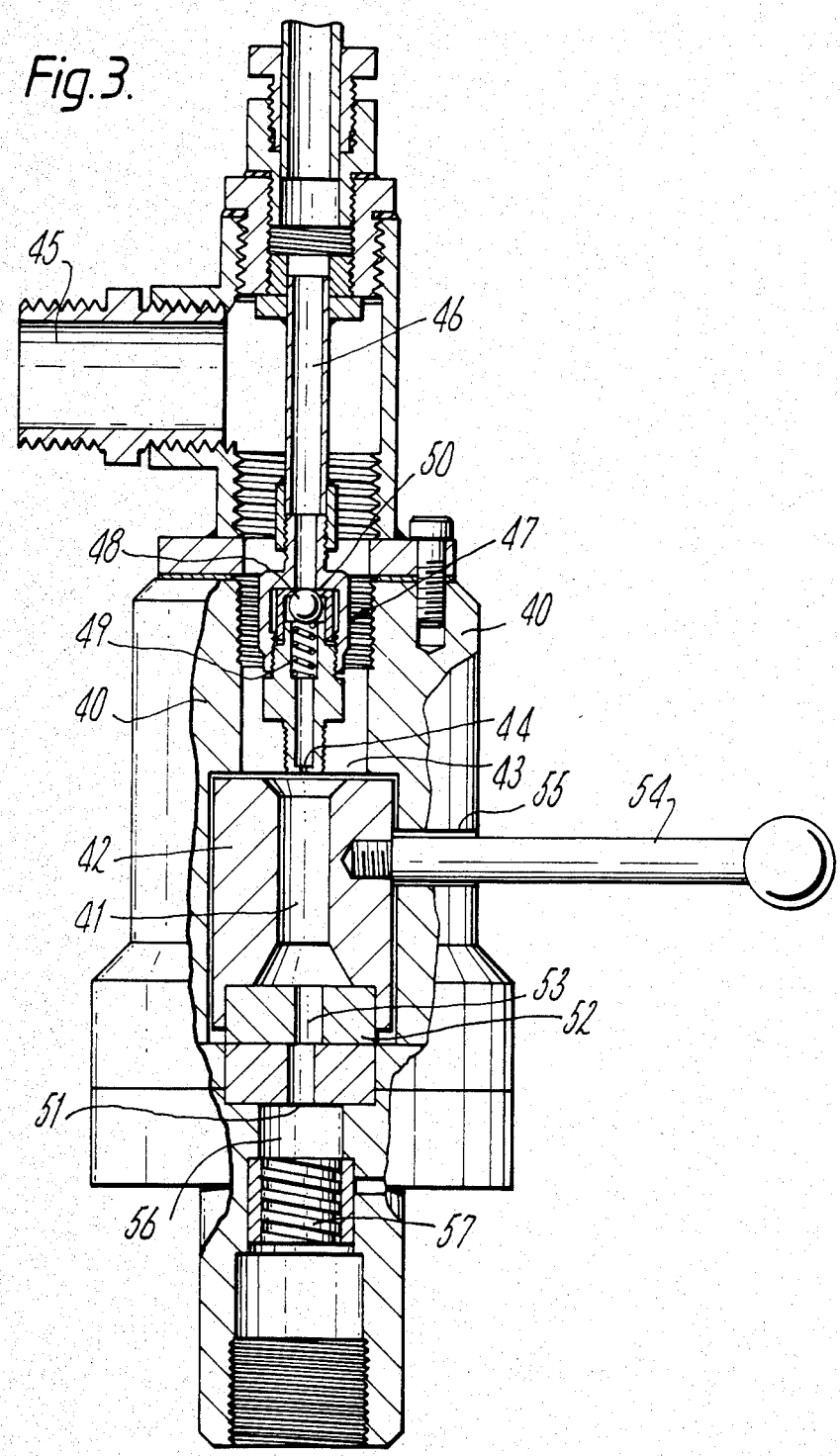
FIG. 3 is a vertical section through another form of apparatus.

The mixer shown in FIG. 3 comprises a housing 40 containing a mixing chamber 41 defined by a mixing chamber block 42 that is coaxial with a first annular inlet 43 and a second coaxial inlet 44. Bolted into the chamber 40 is a water supply duct 45 and a polymer supply duct 46. Duct 46 includes a non-return valve assembly 47 that comprises a ball 48 urged by a spring 49 against a seat 50 at which it closes the duct when polymer flow through the duct towards the mixing chamber 41 falls to a level sufficient to allow the spring to hold the ball on the seat.

The mixing chamber 41 leads to an orifice 51 at which the liquid streams mixed in the mixing chamber are discharged under high shear into a duct 56. The orifice 51 is coaxial with the mixing chamber. An apertured plate 52 having an aperture 53 is fixed to the block 42 and is eccentrically mounted with respect to the orifice 51. An arm 54 is secured to the block 42 and can be moved through a radial slot 55 so as to rotate the block 42 around its axis, and thus to rotate the orifice plate 52 eccentrically with respect to the orifice 51.

The duct 56 includes a shear helix 57 so as to impart rapid rotation to the stream passing through the duct 56, and the stream is then discharged into the water to be treated.

In the following examples reference is made to FIGS. 4 to 7. Each of these shows the sedimentation rate of a 2% china clay suspension after the addition of 3 mg/l polymer, flocculation performance being assessed at intervals for a period of two hours after the addition of polymer to the suspension so as to assess the rate of development of flocculation performance. In each of FIGS. 4 to 7 curve A is the curve obtained by the exemplified process of the invention while curve B is the curve obtained by the low shear mixing method described in Example 1. The activator in Examples 2 to 4 is Ethylan 55.

EXAMPLE 1

A high molecular weight polyacrylamide is produced as a fine dispersion in oil by a reversed phase suspension polymerisation route. The particles are substantially anhydrous, as a result of azeotropic distillation of the dispersion and the dispersion consists of approximately equal amounts of polymer and oil and the polymer particles have an average size of 2 $\mu$m. One part of this dispersion is mixed with 99 parts water using a mixing head as illustrated in FIG. 1, giving a 0.5% active polymer solution. The pressure drop between point A and the nozzle orifice 2 was about 8.5 kg per sq. cm (125 p.s.i.) and the duration of residence between the inlet point 7 and the orifice 2 was about 9.2 milliseconds. The size of the orifice was 9 mm diameter.

Under these conditions the size of the droplets of solution formed by the orifice are about 220 $\mu$m. Examination of the droplets emerging from the orifice shows that they contain microdroplets of the non-aqueous liquid, these microdroplets having a diameter of from 2 to 4 $\mu$m. On average each aqueous droplets contained approximately 1 microdroplet. Since 50% of the volume of the polymer in oil dispersion is provided by the polymer this indicates that each polymer particle is substantially individually wetted out within each aqueous droplet.

The droplets are discharged into the vessel 3 containing further water in which dissolution can continue.

A sample of the polymer solution was immediately assessed for flocculation performance, as described above and is plotted in FIG. 4 as curve A.

As control, 0.5% active polymer solution was prepared by syringing the required quantity of the same polymer dispersion, as above, into 100 ml of water in an 8 oz. bottle. The bottle was immediately capped and shaken manually for 10 seconds. The solution was allowed to stand, and again flocculation performance assessed at intervals over a 2 hour period, representing low shear activation conditions and is plotted in FIG. 4 as curve B.

Figure 4:
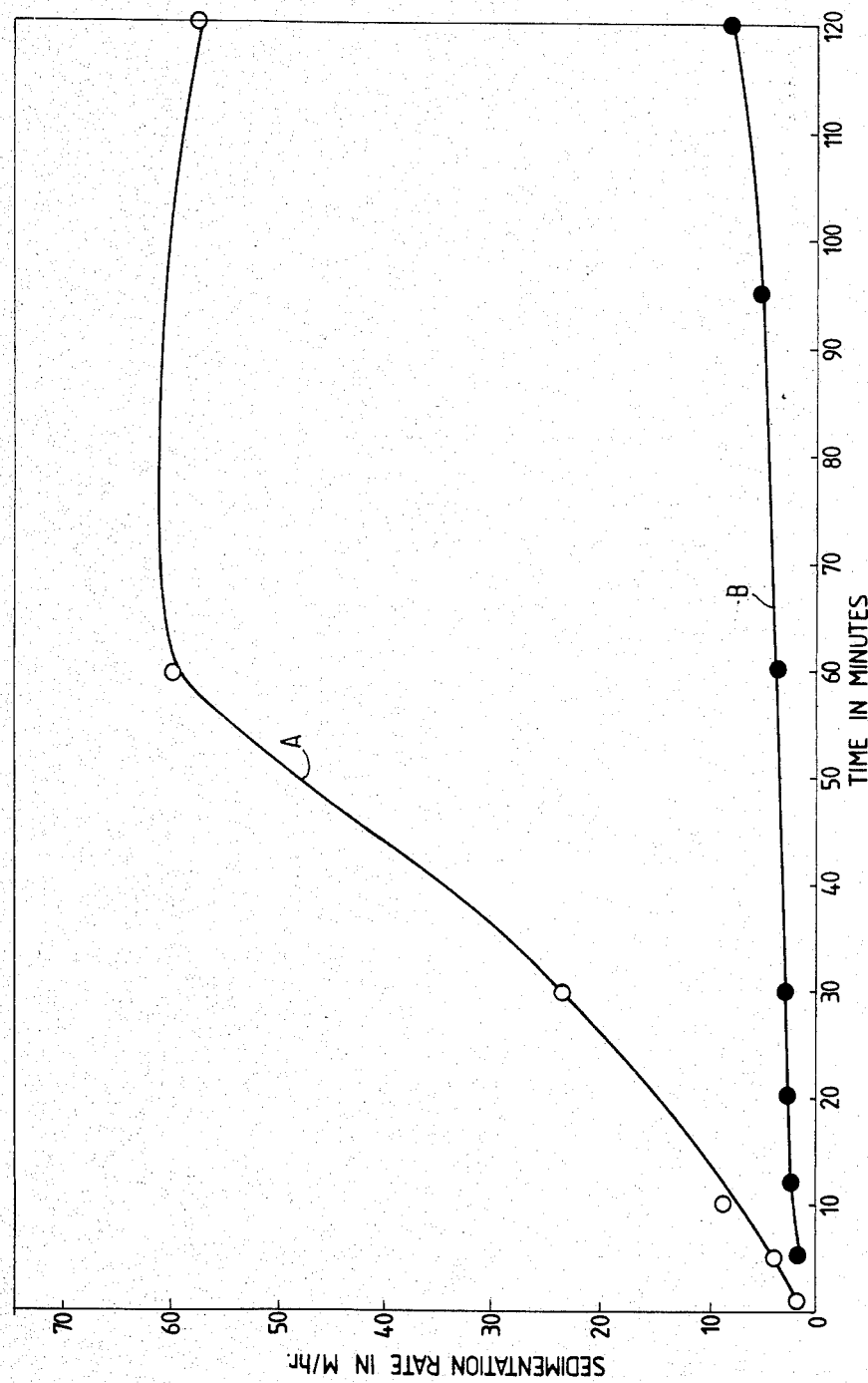
FIGS. 4 to 7 are graphs showing results obtainable by the invention compared to those obtained using conventional shear mixing.

Initial results were carried out with polymer dispersions in oil containing no added chemical activator. FIG. 4 compares the rate of build-up of flocculation performance of the low shear and high shear activation techniques.

Using high shear activation according to this invention maximum performance has been achieved after 1 hour. Under low shear activation poor dissolution of polymer has been attained and very little improvement in polymer performance has been achieved even after 2 hours ageing.

EXAMPLE 2

Figure 5:
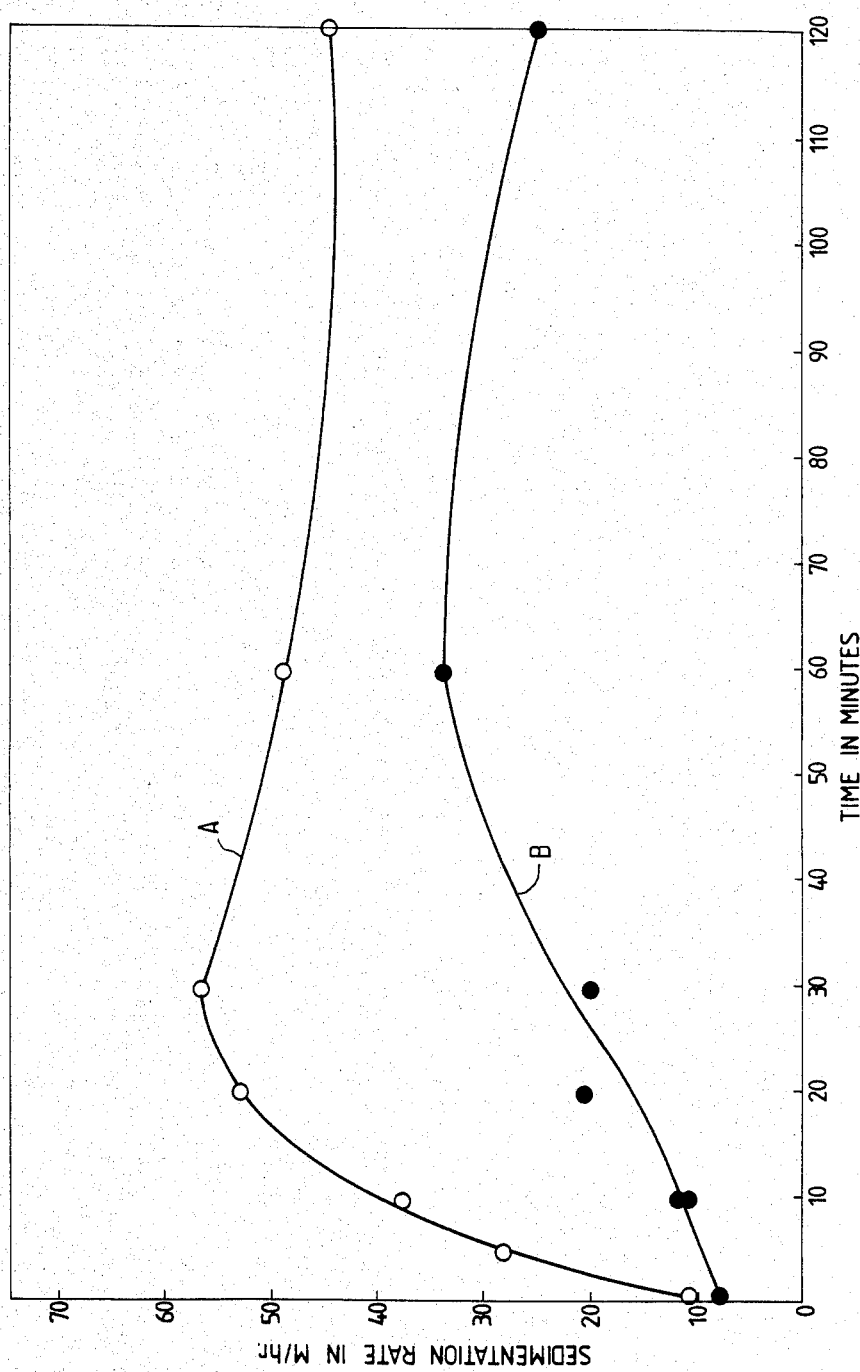

The experiment defined in Example 1 was repeated with the addition of 1% chemical activator to the polymer in oil dispersion. The results in FIG. 5 shows that using high shear activation maximum flocculation performance has occurred after approximately 25 minutes. Under low shear activation maximum performance has taken 1 hour to achieve, and the flocculation performance never reached the results using high shear activation conditions.

EXAMPLE 3

Figure 6:
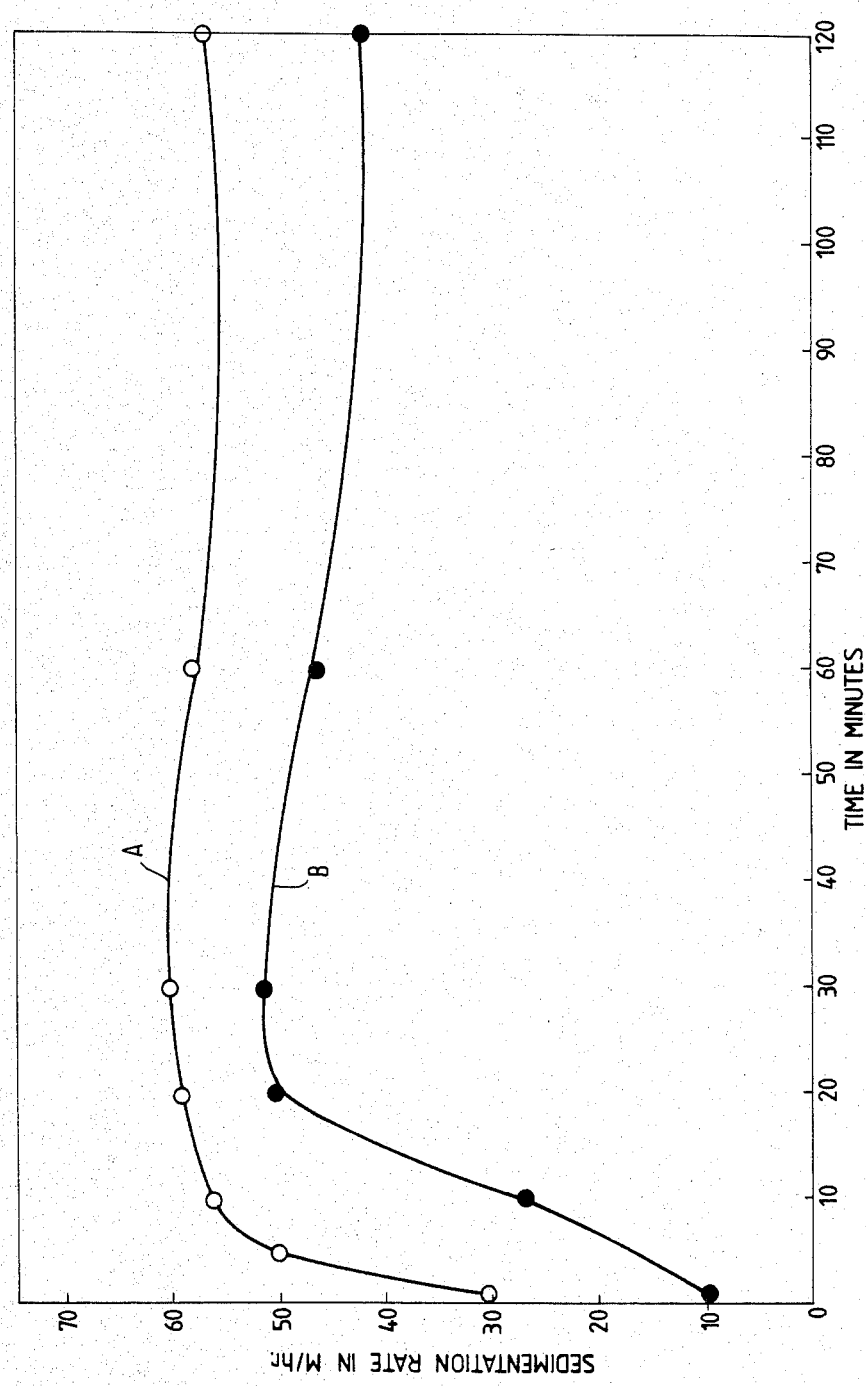

The experiment defined in Example 1 was repeated with the addition of 2.5% chemical activator to the polymer in oil dispersion. The result in FIG. 6 shows that using high shear activation, maximum flocculation performance was achieved after 10 minutes. Under low shear activation conditions maximum performance is lower than that achieved with high shear activation, and the rate of development of flocculation performance is correspondingly lower achieving full performance after 20 minutes.

EXAMPLE 4

Figure 7:
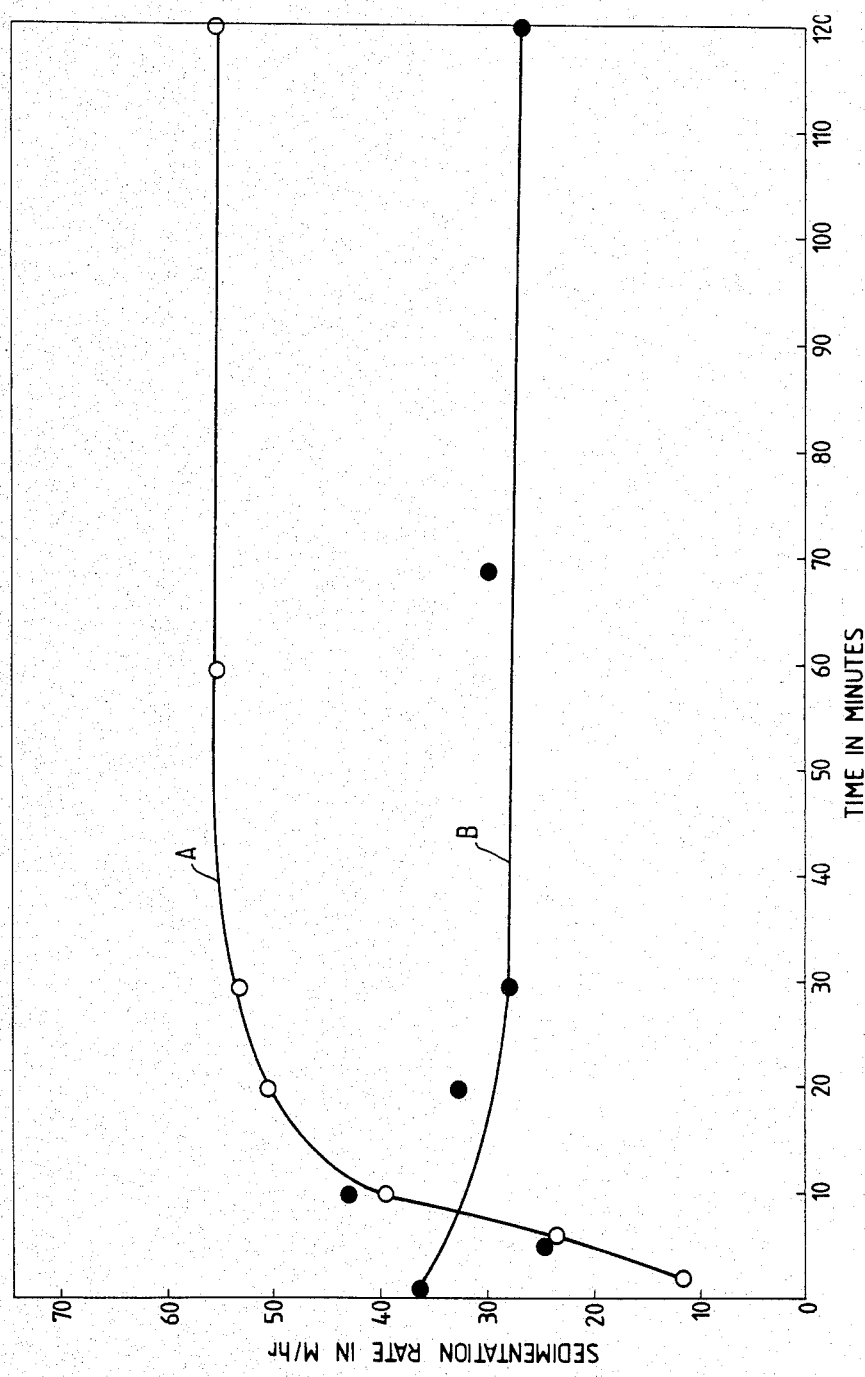

The experiment defined in Example 1 was repeated with the addition of 5% chemical activator to the polymer in oil dispersion. The result in FIG. 7 showed that using high shear activation, maximum flocculation performance was achieved after 20 minutes. Under low shear activation conditions maximum performance is lower than that achieved with high shear activation and the rate of development of flocculation performance is correspondingly lower, although the rate of attainment of maximum performance was fast achieving optimum results after 10 minutes.

The examples show that the high shear method of the invention consistently gives better flocculation results that conventional low shear methods, even in the presence of activator, and that it gives best results in the absence of activator.

We claim:

1. A process of dissolving into water the polymer particles of a dispersion of the particles in a non-aqueous liquid using an orifice mixer, the process comprising forcing the dispersion and the water into the orifice mixer and thereby bringing the dispersion and the water into contact under high shear, and ejecting the resultant mixture from the orifice within a period of less than about 100 milliseconds from the time of contact and in which the pressure drop between the pressure where the dispersion and the water come into contact and the constant pressure of the mixture after said ejection is at least 6 kg/cm$^2$.

2. A process according to claim 1, in which the pressure drop between the point of contact between the water and the dispersion and the substantially constant pressure of the mixture after ejection is at least 1.4 kg/cm$^2$ and this pressure drop is achieved over a period of less than 50 milliseconds from contact.

3. A process according to claim 1, in which the mixture is ejected from the orifice substantially directly into bulk dilution water.

4. A process according to claim 1 in which the mixture is ejected from the orifice with a rotational motion substantially directly into bulk dilution water.

5. A process according to claim 1 in which the orifice mixer has a mixing chamber having an inlet for dispersion into the chamber, an inlet for water into the chamber and the outlet orifice leads from the mixing chamber and in which the inlet for the dispersion terminates in the mixing chamber as an orifice.

6. A process according to claim 1, in which the orifice mixer has a mixing chamber and an inlet for the dispersion into the chamber and an inlet for water into the chamber and the inlet for the dispersion, at or near the point where the inlet terminates in the mixing chamber, includes a valve and the valve is held open by flow of the dispersion during normal flow and automatically shuts the inlet when the flow rate drops.

7. A process according to claim 1, in which the pressure drop between the pressure where the water and the dispersion are brought into contact and the substantially constant pressure after ejection from the orifice is selected by adjusting the effective outlet area of the orifice.

8. A process according to claim 7, in which the selection is effected by mounting adjacent the orifice an aperture plate having an aperture overlapping the orifice but eccentric with respect to the orifice and rotating the aperture plate relative to the orifice to expose the desired effective outlet area of the orifice.

9. A process according to claim 1, in which the mixture is forced through a helical groove formed between a substantially cylindrical outer housing and a removable substantially cylindrical inner housing so as to promote substantially homogeneous dispersion of the dispersion into water.

10. A process according to claim 1, in which the dispersion is formed of one part by weight polymer solids, 0.3 to 3 parts by weight of the non-aqueous liquid and 0 to 10 parts by weight water absorbed into the polymer particles, and the amount of water mixed with the dispersion to initiate dissolution is 50 to 1000 parts by weight.

11. A process according to claim 1, in which the mixture of water and dispersion is substantially free of oil-in-water dispersing agent.

12. A process according to claim 1 in which the homogeneous dispersion of the dispersion into water is effected by dispersing the non-aqueous liquid into water as droplets each containing from 1 to 5 particles of polymer.

* * * * *